United States Patent [19]
Alsup

[11] Patent Number: 5,724,764
[45] Date of Patent: Mar. 10, 1998

[54] STORAGE BOX

[76] Inventor: Charles Kent Alsup, P.O. Box 1425, Beaver, Utah 84713

[21] Appl. No.: 541,728

[22] Filed: Oct. 10, 1995

[51] Int. Cl.$^6$ .................................................. A01K 97/06
[52] U.S. Cl. ........................... 43/54.1; 43/57.1; 220/525
[58] Field of Search .............................. 43/54.1, 57.1; 206/315.11; 220/525, 523, 253, 254

[56] References Cited

U.S. PATENT DOCUMENTS

| | | | |
|---|---|---|---|
| 2,214,993 | 9/1940 | DeWitt | 220/525 |
| 2,242,059 | 5/1941 | DeWitt | 220/525 |
| 2,246,626 | 6/1941 | Grandin | 43/57.1 |
| 2,412,332 | 12/1946 | Hansen | 220/525 X |
| 2,734,306 | 2/1956 | Holdeman | 43/57.1 |
| 3,154,880 | 11/1964 | Campbell | 43/57.5 |
| 3,286,390 | 11/1966 | Guice | 43/57.5 |
| 3,329,477 | 7/1967 | Haugen, Jr. | 43/57.5 |
| 4,057,145 | 11/1977 | Wray et al. | 220/525 X |
| 4,813,173 | 3/1989 | Abbotoy | 43/57.1 |

*Primary Examiner*—Jeanne Elpel
*Attorney, Agent, or Firm*—Patent & Trademark Services; Joseph H. McGlynn

[57] ABSTRACT

A storage box with compartments for items, such as fishing hooks, sinkers and lures, having a pair of endless belts which revolve perpendicular to each other. Each belt has at least one aperture in it, so that when the respective apertures in the belts are aligned with a compartment in the box, the item in that compartment can be removed. An other embodiment has only a single belt with an aperture that will allow the removal of large items. A third embodiment has an endless belt with a disc, having an aperture, pivoted on the belt. A pair of tensioning devices may also be used to maintain the belts in a snug fit around the storage boxes.

9 Claims, 2 Drawing Sheets

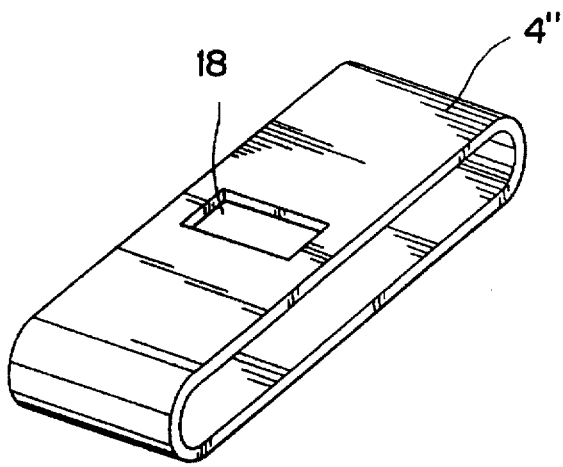
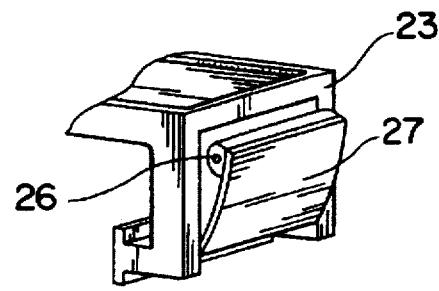
FIG. 6  FIG. 7
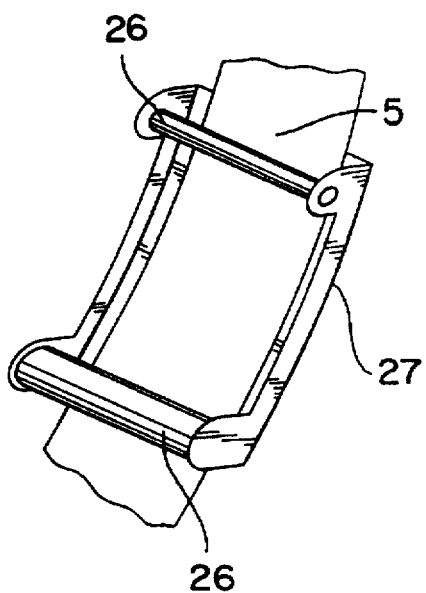
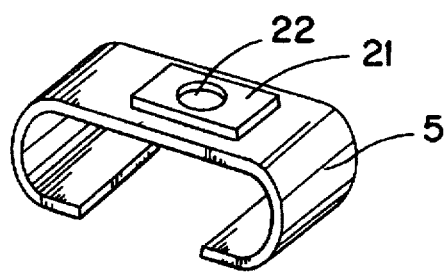
FIG. 8  FIG. 9

STORAGE BOX

BACKGROUND OF THE INVENTION

This invention relates in general to a storage box and in particular to a storage box for items such as fishing lures.

DESCRIPTION OF THE PRIOR ART

In the prior art, storage boxes of this type have been available, however, all of the prior art devices have involved complicated moving belts that had storage compartments attached to the belt. This was a complicated system and suffered from many problems associated with the belt jamming. Also, since the storage compartments moved in a circular or oval path, the lids were prone to coming off when the compartment was in an upside-down orientation. When a fly or other fishing item came out of its compartment it could jam the belt making most of the items inaccessible.

SUMMARY OF THE INVENTION

This invention addresses and solves the problems associated with the prior art devices by removing the storage containers from the moving belt. In one embodiment a pair of endless belts move perpendicular to each other. Each belt has apertures that must be lined up with each other and with one of the storage compartments in order to remove the item stored in the compartment. In a second embodiment a rotating disc with an aperture is mounted on the revolving belt. The belt is rotated until the disc is over the compartments and then the aperture in the disc must be aligned with the aperture in the storage compartment and an aperture in the belt in order to remove the item stored in the compartment. In a third embodiment, intended for large fishing accessories, each compartment extends across the entire box. Therefore, the second belt and the revolving disc are unnecessary. A single belt with a single aperture is rotated until the aperture in the belt aligns with one of the storage compartments in order to remove the item stored in the compartment.

It is an object of the present invention to provide a storage box for fishing accessories that is inexpensive, easy to use and reliable.

It is an object of the present invention to provide a storage box for fishing accessories in which the endless belt remains taut.

It is an object of the present invention to provide a storage box for fishing accessories for safely storing the accessories against damage or loss, while permitting quick and easy access.

It is an object of the present invention to provide a storage box for fishing accessories which will accommodate a large number of items in an orderly fashion to facilitate selection of a desired item.

It is an object of the present invention to provide a storage box for fishing accessories which is lightweight, compact and economical to manufacture.

These and other objects and advantages of the present invention will be fully apparent from the following description, when taken in connection with the annexed drawings.

BRIEF DESCRIPTION OF THE DRAWINGS

FIG. 6 is a third embodiment of the storage box.

FIGS. 7 and 8 are views of the tensioning means for one of the belts.

FIG. 9 is a view of one of the belts with a glued on door.

DESCRIPTION OF THE PREFERRED EMBODIMENT

Figure 1:
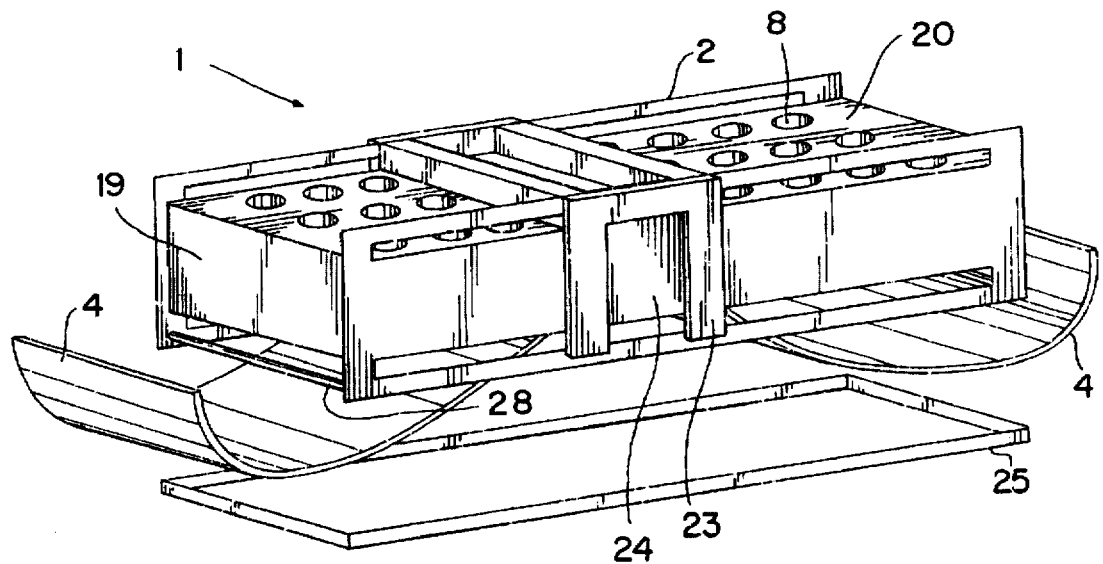
FIG. 1 is a perspective view of the storage box of the present invention.

Referring now to the drawings in more detail, FIG. 1 shows a storage box 1 for storing fishing accessories such as, but not limited to, hooks, flies, and sinkers. The box 1 has sides 2 and ends 19. The top surface of the box 20 has a plurality of compartments 8 which will be used to store fishing accessories. It should be noted that the box is shown as being rectangular and the compartments as circular, however this is merely for illustration purposes, and the shape of the box and the compartments could be any convenient shape. The box has a bottom cover 25 attached thereto.

Encircling the box 1 is an endless, transparent belt 4 which has an aperture 6 similar to aperture 18 (shown in FIG. 6) which is large enough to uncover an entire row of compartments 8. The belt 4 should be made of a flexible, transparent material which will not be damaged by fresh or salt water, and will be glued together to form an endless belt. It should be noted that the belt 4 in FIG. 1 is shown before the ends of the belt are glued together to make an endless belt. The transparent material will allow the fisherman to see all the items to make selecting the needed item easier. Also, mounted at the ends of the box are pinions 28 which will allow the belt 4 to move smoothly.

Figures 2, 3:
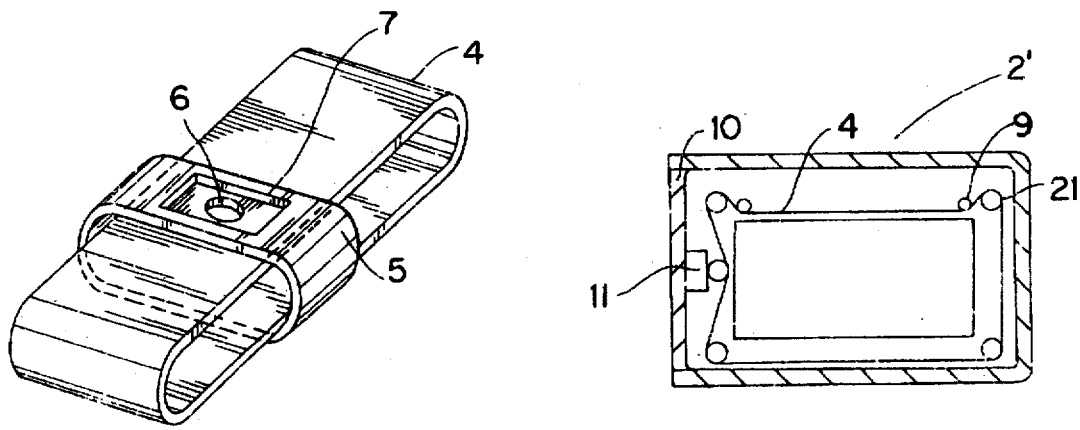
FIG. 2 is a schematic view showing the revolving belts with the storage box removed for clarity.
FIG. 3 is a view of a tensioning device for one of the belts.

A second endless belt 5, as shown in FIGS. 1 and 2, encircles the box 1 and the first belt 4 and has an aperture 6 which will uncover one of the compartments 8. The belt 5 is made similar to the belt 4 and is made as a rectangular piece of material that is glued together to form an endless belt.

At the side of the box is a guide 23 for the belt 5. The belt will slide back and forth in the guide 23, to allow the aperture 6, and the aperture in the belt 4 to align. The guide 23 can be moved from one end of the box to the other so the user will be able to select which ever row of compartments holds the accessory he wants.

Also, it does not matter whether belt 5 is beneath belt 4, or whether belt 4 is beneath belt 5. Whichever is the case, the belts should be of a size to provide a snug fit around the box 1 so the belts will remain in whatever position they are placed. If the belts are too loose they will tend to slide and allow the contents of the compartments to slip out. This could result in a jammed belt which will make removing the items from the compartments difficult. At the bottom of the box is a cover 25 which will be secured to the bottom of the box in any conventional manner such as by, but not limited to, a friction fit once the belts are assembled onto the box.

In FIGS. 7 and 8, a lever holding assembly for the belt 5 is disclosed. The lever 27 could be mounted in the aperture 24 in the guide 23 (shown in FIG. 1 and FIG. 7). Also, a second lever 27 (not shown) could be mounted on the opposite side of the box. The belt 5 will pass under pinions 26. The bottom pinion will be pivoted to the guide 23 by any conventional means. A conventional spring (not shown) could be used to hold the top of the lever away from the guide 23 (as shown in FIG. 7). When the lever is in the position shown in FIG. 7 the top pinion will hold the belt 5 away from the side of the box, thereby making the belt tighter. When a user wants to move the belt, he/she will push the top of the lever toward the box, which will loosen the belt so it can be moved.

The process of using the storage box will now be described. When a particular item is needed, the lever 27 will be pushed, the belt 5 will be rotated until aperture 7 is positioned above the proper row of compartments. Then belt 4 will be moved until aperture 6 is positioned over the proper compartment. At this point, depending on the item selected, the fisherman could use his fingers to pick the item out of the compartment. Then he will rotate the belts until their respective apertures are not aligned with any of the compartments and release the lever 27. Since the belts fit around the box 1 snugly, the belts will act as a "lid" in this position and keep all of the items in their respective compartments. Since some items, such as hooks, can impart injuries if grabbed the wrong way, a second method of using the box would be to align the apertures in the belts with the proper compartment and then turn the box over and allow the hook to fall into the palm of the hand. The apertures in the belts could then be misaligned to keep the rest of the items in their proper compartments.

The belts could have segments which are made from an elastic material, over time the natural tensioning ability of the material may be reduced. A tensioning means, which could be added to a box, similar to the box 1, is shown in FIG. 3. This box has at least one open end and the belt 4 is wound around pinions 9 and 21. The open end of the box will receive a block 10 which has a projection 11. As the block 10 is pushed into the box the projection 11 will depress the belt 4 between two of the pinions 21. This will tighten the belt and result in a snug fit around the box once more. Also, it should be noted that the box would have to be made with at least one removable side in this embodiment, so the endless belt 4 could be wound around the pinions.

The block 10 could fit within the sides 2' in a friction fit, or there could be a conventional projection on block 10 which snaps into a groove or grooves on sides 2' which will hold the block 10 in the box. The use of plural grooves would add more adjustments as the belt ages and tends to stretch.

Figure 4:
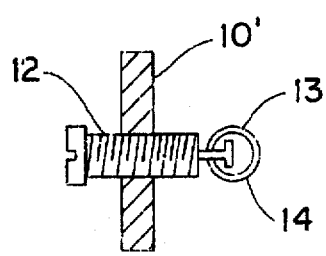
FIG. 4 is a second tensioning device.

A second tensioning means is shown in FIG. 4. Instead of a removable block 10, the block 10' could be permanently attached to the sides of the box, after the belt is assembled. A screw 12 would be threaded through a threaded aperture in the block 10' and the inner end of the screw would be undercut at 14 and have a circular or spherical projection 13 secured thereto. When the screw 12 is rotated the projection 13 will press the belt between the pinions, similar to the operation of the projection 11 in FIG. 3. Of course both projections 11 and 13 should be rounded so they do not damage the belt 4.

Figure 5:
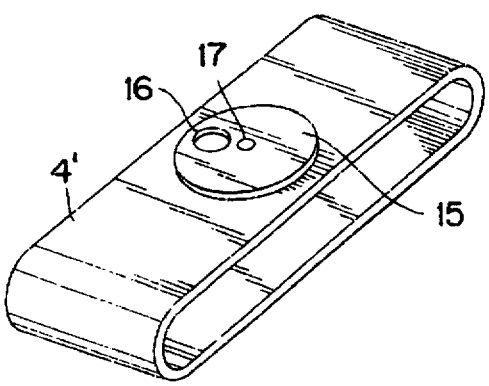
FIG. 5 is a second embodiment of the storage box.

Another embodiment of the storage box is shown in FIG. 5. In this embodiment only a single belt 4' is needed which will have an aperture (not shown) similar to aperture 7 on belt 5 in FIG. 2. Attached to the belt is a disc 15 which has at least one aperture 16. The disc will be pivotably attached to the belt by a shaft 17, which could be a rivet or similar fastener. The belt 4' will operate in the same manner as belt 4 in FIGS. 1 and 2. Once the aperture in the belt is positioned over the proper row of compartments, the disc 15 will be rotated until the aperture 16 aligns with the selected compartment. The disc could have more than one aperture, if desired or necessary.

Another embodiment is shown in FIG. 6. This embodiment has only one belt 4" and a single, large aperture 18. This embodiment is designed for large fishing accessories such as, but not limited to, lures. The box for this embodiment would have only a single compartment extending across the width of the box so a second belt or rotating disc would not be necessary. All that is necessary to use this type of storage box is to rotate the belt 4" until the aperture 18 is aligned with the right compartment, remove the needed item and then rotate the belt until the aperture 18 is not aligned with any of the compartments.

Another embodiment is shown in FIG. 9 in which an endless belt 5 is shown before its ends are secured together. Attached to the belt, such as by gluing, is a door 21 with an aperture 22. The belt would have an aperture directly beneath the aperture 22. The door 21 would help to reinforce the aperture in the belt. This belt would operate in the same manner as the belt 5 in FIG. 2.

Although the storage box and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention. For example the storage box is not limited to storing only fishing accessories. It can be used for storing any item including, but not limited to sewing accessories, medicine in the form of pills, paper clips or safety pins.

What I claim as my invention is:

1. A storage box for storing a multiplicity of items comprising:

a box having two sides, two ends, a top and a bottom, and a multiplicity of compartments for storing items, an endless belt rotatable around said box, an aperture through said endless belt, said endless belt capable of being rotated so that said aperture can be moved to at least a first and a second position, in said first position said aperture is not aligned with any of said compartments, whereby said items in said storage compartments can not be removed from said storage compartments, in said second position said aperture is aligned with a single storage compartment, and wherein there is a second endless belt which moves in a direction perpendicular to said endless belt, said second endless belt having an aperture therethrough, whereby said aperture in said endless belt and said aperture in said second endless belt must be aligned in order to remove an item in said single storage compartment.

2. The storage box as claimed in claim 1, wherein said endless belt is made from an flexible, transparent material.

3. The storage box as claimed in claim 1, wherein said endless belt and said second endless belt are made from an flexible, transparent material.

4. The storage box as claimed in claim 1, wherein
said aperture in said endless belt is larger than said single storage compartment, and
said aperture in said second endless belt is approximately the same size as said single storage compartment.

5. The storage box as claimed in claim 1, wherein said storage box has means for increasing tension on said endless belt.

6. The storage box as claimed in claim 5, wherein said means for increasing tension on said endless belt is a projection which engages said endless belt.

7. The storage box as claimed in claim 5, wherein said means for increasing tension on said endless belt is a rotatable threaded tensioning means, and said rotatable threaded tensioning means engages said endless belt.

8. The storage box as claimed in claim 5, wherein said means for increasing tension on said endless belt is a pivoted lever means which engages said second endless belt means.

9. A storage box for storing a multiplicity of items comprising:

a box having two sides, two ends, a top and a bottom, and a multiplicity of compartments for storing items, an endless belt rotatable around said box, an aperture through said endless belt, said endless belt capable of being rotated so that said aperture can be moved to at least a first and a second position, a rotatable disc attached to said endless belt, said rotatable disc having an aperture therethrough, whereby said aperture in said endless belt and said aperture in said rotatable disc must be aligned in order to remove an item from said compartments.

* * * * *